United States Patent [19]

Takahashi

[11] Patent Number: 5,162,997
[45] Date of Patent: Nov. 10, 1992

[54] CONTROL SYSTEM FOR AUTOMOTIVE VEHICLE FOR CONTROLLING VEHICLE DRIVING BEHAVIOR WITH FEATURE OF HARMONIZATION OF VEHICULAR DRIVING CONDITION DEPENDENT CONTROL AND DRIVER'S DRIVING TENDENCY ADAPTED CONTROL

[75] Inventor: Hiroshi Takahashi, Kanagawa, Japan

[73] Assignee: Nissan Motor Company, Limited, Japan

[21] Appl. No.: 643,582

[22] Filed: Jan. 22, 1991

[30] Foreign Application Priority Data

Jan. 23, 1990 [JP] Japan .................................. 2-11778

[51] Int. Cl.⁵ ............................................ B60K 41/06
[52] U.S. Cl. .......................... 364/424.05; 364/424.1; 74/866; 395/905
[58] Field of Search ...................... 364/424.01, 424.05, 364/424.1; 74/866; 395/905, 24

[56] References Cited

U.S. PATENT DOCUMENTS

| | | | |
|---|---|---|---|
| 4,777,585 | 10/1988 | Kokawa et al. ...................... | 364/164 |
| 4,825,367 | 4/1989 | Nagaoka et al. ................ | 364/424.05 |
| 4,829,434 | 5/1989 | Karmel et al. .................... | 364/424.1 |
| 4,922,428 | 5/1990 | Takahashi ....................... | 364/426.04 |
| 4,930,084 | 5/1990 | Hosaka et al. .................. | 364/426.04 |
| 5,019,979 | 5/1991 | Takahashi ...................... | 364/424.1 |
| 5,036,730 | 8/1991 | Sakai et al. ........................ | 74/866 |
| 5,036,936 | 8/1991 | Kawano et al. ....................... | 180/179 |
| 5,048,100 | 9/1991 | Kuperstein ........................... | 382/36 |
| 5,058,180 | 10/1991 | Khan .................................... | 382/14 |
| 5,067,374 | 11/1991 | Sakai et al. ............................ | 74/866 |
| 5,099,428 | 3/1992 | Takahashi ......................... | 364/424.1 |

FOREIGN PATENT DOCUMENTS 0292286 11/1988 European Pat. Off. .
1-167434 7/1989 Japan .

*Primary Examiner*—Thomas G. Black
*Attorney, Agent, or Firm*—Lowe, Price, LeBlanc & Becker

[57] ABSTRACT

A control system for controlling automotive vehicle driving behavior has a parameter monitoring means for monitoring vehicular driving parameters, a vehicular driving environmental condition predicting means which predicts vehicular driving environmental condition based on generalized intelligence base which is common to all vehicles, a control output generating means for deriving a control output on the basis of the predicted vehicular driving environmental condition, a personal driving characteristics detecting means for detecting unique characteristics of each individual driver, a control output recollecting means which learns relationship between said vehicular driving parameters and the personal driving characteristics for recollecting control output on the basis of said vehicular driving parameters, and a control output selecting means which selects one of control outputs from said control generating means and said control output recollecting means in such that when recollected control output present, the recollected control output is selected and, otherwise the control output derived by the control output generating means is selected.

8 Claims, 4 Drawing Sheets

CONTROL SYSTEM FOR AUTOMOTIVE VEHICLE FOR CONTROLLING VEHICLE DRIVING BEHAVIOR WITH FEATURE OF HARMONIZATION OF VEHICULAR DRIVING CONDITION DEPENDENT CONTROL AND DRIVER'S DRIVING TENDENCY ADAPTED CONTROL

BACKGROUND OF THE INVENTION

1. Field of the Invention

The present invention relates generally to a control system for an automotive vehicle for controlling vehicular driving behavior. More specifically, the invention relates to a vehicle driving control system which tactically combining non-human control which is performed purely depending upon vehicular driving parameters reflecting vehicular driving condition and/or vehicular environmental condition and human control which is performed with taking driver's driving characteristics, feeling, tendency and so forth into account.

2. Description of the Background Art

In the modern automotive technologies, various vehicular driving control systems have been proposed and developed in order to optimize vehicular driving performance and behavior. Many of such control systems monitors vehicular driving condition and vehicular driving environmental condition for depending thereupon. Such type of control derives control signals purely depending upon the monitored vehicle driving condition and environmental condition and according to preprogrammed and rigidly set control schedule irrespective of the driver's driving characteristics, feeling, tendency and other human feeling factor. Therefore, such type of control will be referred to as "non-human control". On the other hand, according to progress of computer technologies, there have been developed fuzzy computer, neuron computer, artificial intelligence (AI) computer and so forth. Such advanced computer technologies enables to automotive control systems to perform control operations not only depending upon vehicle driving condition and vehicular environmental condition but also depending upon driver's driving characteristics, tendency, feeling and so forth. Such type of control will be hereafter referred to as "human control".

For example, Japanese Patent First (unexamined) Publication (Tokkai) Heisei 1-167434 discloses a throttle control system for an automotive internal combustion engine, in which a throttle valve angular position is controlled in response to depression of an accelerator pedal. The disclosed control system recognizes vehicular driving environmental condition, such as hill climbing, heavy traffic road and so forth, and selects one of a plurality of control characteristics maps depending upon the vehicular driving environmental condition. Map look-up is performed against the selected one of map in terms of the operational magnitude of the accelerator pedal. The shown system further predict the driver's will of vehicular behavior, acceleration and deceleration characteristics, e.g. swift acceleration, moderate acceleration, according to driver's accelerator control behavior.

Though such advanced vehicle control systems have obtained certain gain to make the vehicular driving behavior closer to the ideal or optimum behavior. However, on the other hand, the control systems proposed in the prior art have not been completely satisfactory. Particularly, since the prior proposed system have non-human control and human control mixingly. It required another logic for governing interrelation between the non-human control and the human control. The conventional control system requires substantial cost in development of control programs. Further to say, the conventionally developed control systems have been generally based on the traditional non-human control logic and taken the human factor as correction parameters for make the control characteristics close to the driver's feeling. For accomplishing this, logic of control had to be established with taking all parameters both for non-human control and human control. In order to establish correction pattern for human control, lots of experiments has to be made and the result of such experiments had to be reflected. Therefore, despite of the extensive effort in establishing the correction pattern, the established correction pattern cannot be satisfactorily adapted for all driver's driving characteristics.

Furthermore, in the prior proposed systems, there is a tendency to arise inconsistency between non-human control and human control. In order to manage such inconsistency and govern control system, another logic for selecting one of non-human or human control becomes necessary. This clearly increases cost for designing and developing the control system.

SUMMARY OF THE INVENTION

Therefore, it is an object of the present invention to provide a novel control system for an automotive vehicle which can satisfactorily establish harmonization of non-human control and human control with lesser effort in designing the system.

In order to accomplish aforementioned and other objects, a control system for controlling automotive vehicle driving behavior, according to the present invention, has a parameter monitoring means for monitoring vehicular driving parameters, a vehicular driving environmental condition predicting means which predicts vehicular driving environmental condition based on generalized intelligence base which is common to all vehicles, a control output generating means for deriving a control output on the basis of the predicted vehicular driving environmental condition, a personal driving characteristics detecting means for detecting unique characteristics of each individual driver, a control output recollecting means which learns relationship between said vehicular driving parameters and the personal driving characteristics for recollecting control output on the basis of said vehicular driving parameters, and a control output selecting means which selects one of control outputs from said control generating means and said control output recollecting means in such that when recollected control output present, the recollected control output is selected and, otherwise the control output derived by the control output generating means is selected.

According to one aspect of the invention, a control system for an automotive vehicle for controlling vehicular component, comprises:

first means for monitoring preselected control parameters for producing a control parameter indicative signals;

second means for deriving a first control signal on the basis of the parameter indicative signals according to a preset common control schedule which defines operating modes of the vehicular component in relation to operating condition represented by the control parameter;

third means for accepting manual entry of command for selecting operational mode of the vehicular component and learning operating conditions at entry of the manually entered command as a personal unique data reflecting driver's preference;

fourth means for detecting the control parameter indicative signals representing operational condition coincidence with learnt condition for recollecting manually commanded operational mode and for producing a second control signal; and fifth means for selectively supplying one of the first and second control signals to the vehicular component for controlling operation thereof, the control signal supplying means outputting the first control signal while absence of the second control signal and outputs the second control signal while the second control signal present.

The third means may include neural network for learning operational condition of the vehicular component at the occurrence of manually entered command for updating neural network storage.

According to another aspect of the invention, a control system for an automotive vehicle for controlling vehicular component, comprises:

first means for monitoring preselected vehicle driving parameters for producing a vehicle driving parameter indicative signals;

second means for deriving a first control signal on the basis of the parameter indicative signals according to a preset common control schedule which defines operating modes of the vehicular component in relation to vehicular driving condition represented by the control parameter;

third means for accepting manual entry of command for selecting operational mode of the vehicular component and learning vehicular driving conditions at entry of the manually entered command as a personal unique data reflecting driver's preference;

fourth means for detecting the control parameter indicative signals representing vehicular driving condition coincidence with learnt condition for recollecting manually commanded operational mode and for producing a second control signal; and fifth means for selectively supplying one of the first and second control signals to the vehicular component for controlling operation thereof, the control signal supplying means outputting the first control signal while absence of the second control signal and outputs the second control signal while the second control signal present.

The third means may include neural network for learning vehicular driving condition at the occurrence of manually entered command for updating neural network storage. Preferably, the fourth means is responsive to the vehicle driving parameter indicative signal for predicting a vehicle driving condition and recollects one of manually entered command when the predicted vehicle driving condition coincidence with the corresponding learnt driving condition for deriving the second control signal based on the recollected command.

According to a further aspect of the invention, a shift control system for an automotive automatic power transmission comprises:

an automatic power transmission unit having electrically operably shift control means for selectingly establishing one of a plurality of transmission speed ratio;

a sensor means for monitoring vehicle driving parameter associated with transmission speed ratio selection for producing a vehicle driving condition indicative parameter signal;

a shift pattern storage means storing a plurality of preset shift patterns which are set in terms of the vehicle driving parameter;

a manual selector means for manual entry of a pattern selector command for manually selecting one of a plurality of shift patterns in the shift pattern storage means;

a neural network responsive to the manually entered pattern selector command for learning condition of the vehicle driving conditions based on the vehicle driving condition indicative parameter signal and updating storage therein;

a controller means for detecting vehicle driving condition based on the vehicle driving condition indicative parameter signal, comparing the detected vehicle driving condition with learnt vehicle driving conditions, recollecting one of commands stored in the neural network when the detected vehicle driving condition coincidence with the learnt vehicle driving condition, and otherwise selecting one of a plurality of shift pattern according to a predetermined shift pattern selecting schedule, and performing shift control by controlling operation of the shift control means according to the selected shift pattern.

The controller means may predict vehicle driving condition including vehicle driving environmental condition based on the vehicle driving condition indicative parameter signal and performs recollection of one of the stored commands and selection of shift pattern based on the predicted vehicle driving condition. In such case, the controller means may generate a first control signal based on the shift pattern selected according to the predetermined shift pattern selecting schedule and a second control signal based on the shift pattern corresponding to the recollected command, and selects the second control signal whenever the recollected command is present and otherwise selects the first control signal.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
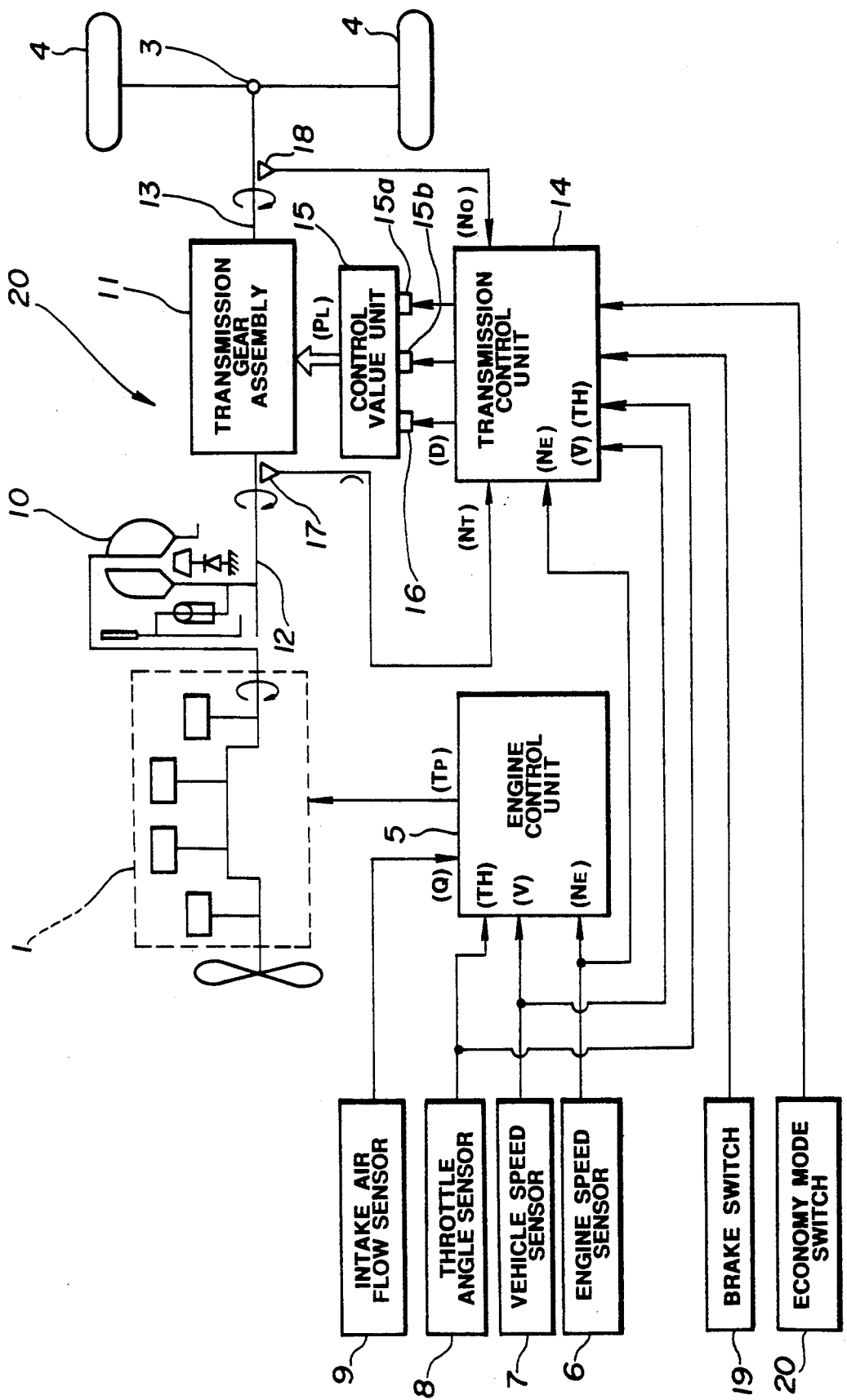
FIG. 1 is a schematic block diagram of the preferred embodiment of a control system, according to the invention, in which the idea of the present invention is applied for shift control for an electronically controlled automatic power transmission.

Referring now to the drawings, the preferred embodiment of a control system according to the present invention, will be discussed hereinbelow in terms of shift control of an automatic power transmission of an automotive vehicle. However, as can be understood, the control system according to the present invention is applicable not only to automatic power transmission shift control, but also to controls for an automotive internal combustion engine, a suspension system, a brake system, a steering system and so forth. Further to say, the idea of the present invention may also applicable for automatic air conditioner control, audio control and so forth. Therefore, the preferred embodiment of the control system which hereinafter discussed, should be understood as one of a plurality of applications of the inventive idea of the invention.

Referring now to FIG.1, the preferred embodiment of the control system is applied to an automotive vehicle which has an electronically controlled fuel injection internal combustion engine 1, an automatic power transmission 2 incorporating a torque converter 10. The automatic power transmission 2 forms a power train together with a differential gear unit 3 for adjusting driving torque to be distributed to driving wheels 4.

As is well known, the electronically controlled fuel injection internal combustion engine 1 is controlled a fuel injection amount and spark ignition timing by means of an engine control unit 5 which comprises a microcomputer. In order to provide engine control parameters, various engine driving parameter sensors, such as an intake air flow sensor 9, a throttle angle sensor 8, a vehicle speed sensor 7, an engine speed sensor 6 and so forth are connected to the engine control unit 5. Though FIG. 1 explanatorily illustrates only elemental engine driving parameter sensors listed above, additional sensors can be provided for supplying additional engine control parameters in order to adapt the engine control characteristics to the driving conditions. As is well known, the intake air flow sensor may comprise a flap type air flow meter, hot wire air flow meter, Karman's vortex type air flow meter and so forth for monitoring air flow rate through an induction passage of the engine 1 and produce an intake air flow rate indicative signal Q. This air flow sensor 9 thus provides an engine load condition indicative parameter. In this sense, the air flow meter can be substituted with an intake vacuum sensor. The throttle angle sensor 8 is associated with a throttle valve in the induction system for monitoring an angular position of the throttle valve to produce a throttle angle indicative signal TH. The vehicle speed sensor 7 is designed for monitoring a vehicular travailing speed to produce a vehicle speed indicative signal V. The engine speed sensor 6 may comprises a crank angle sensor which monitors crankshaft angular position to produce a crank reference signal at every predetermined angular position of the crankshaft and a crank position signal at every predetermined angle of angular displacement of the crankshaft. The engine speed is derived on the basis of one of the crank reference signal and crank position signal. The engine speed sensor 6 thus provide an engine speed indicative signal $N_E$.

The engine control unit 5 processes the input engine driving parameters from the sensors to derive a fuel injection amount, spark ignition timing and so forth. As is well known, a basic fuel injection pulse width $T_p$ is derived based on the engine load Q and the engine speed $N_E$. The basic fuel injection pulse width $T_p$ may be corrected based on various correction coefficients. On the other hand, basic spark advance is derived on the basis of the $T_p$ value and the engine load Q and corrected with various known correction factors. The engine control unit 5 thus outputs a fuel injection control signal and a spark ignition control signal at predetermined timings which is determined in relation to the engine revolution cycle.

The torque converter 10 is associated with the output shaft of the engine 1 to be driven by the engine output torque. The torque converter 10 is connected to an input shaft 12 of a transmission gear assembly 11 which includes a plurality of friction elements, e.g. clutches and brakes, to selectively establish various transmission speed ratio. The transmission gear assembly 11 is connected to the differential gear unit 18 via an output shaft 13.

In order to control engagement and disengagement of the friction elements in the transmission gear assembly 11, a control valve unit 15 is provided. The control valve unit 15 includes a line pressure controlling duty solenoid 16, a shift control solenoids 15a and 15b. The control valve unit 15 modulates line pressure $P_L$ to be supplied for respective friction elements and controls distribution of the line pressure for selectively supplying the line pressure to respective friction elements in order to selectively establish and release engagement to establish desired one of the transmission gear ratio. The operation of the control valve unit 15 is controlled by control signals supplied from a transmission control unit 14 which also comprises a microcomputer.

In general, the transmission control unit 14 controls energization and deenergization of the solenoids 15a and 15b for establishing and releasing engagement of the friction elements in the transmission gear assembly 11 with combination of the energized and deenergized solenoids, which combination of the energized and de-energized solenoids defines mutually distinct working fluid path for supplying line pressures. Also, the transmission control unit 14 controls energization and deenergization of the duty solenoid 16 with a given duty cycle in order to modulate predetermined magnitude of line pressure $P_L$.

In order to perform control for operation of the transmission, the transmission control unit 14 is connected to the throttle angle sensor 8, the vehicle speed sensor 7, the engine speed sensor 6 to receive therefrom the throttle angle indicative signal TH, the vehicle speed indicative signal V and the engine speed indicative signal $N_E$. In addition, the transmission control unit 14 is connected to an input speed sensor 17 which is associated with the input shaft 12 to monitor the rotation speed at the input shaft, and an output speed sensor 18 associated with the output shaft 13 to monitor the rotation speed of the output shaft. The input speed sensor 17 produces an input speed indicative signal $N_T$ based on the monitored input speed. On the other hand, the output speed sensor 18 produces an output speed indicative signal $N_O$ representive of the monitored rotation speed at the output shaft 13. Furthermore, the transmission control unit 14 is connected to a brake switch 19 which is detective of application of brake and produces a braking condition indicative signal when depression of a brake pedal is detected. The transmission control unit 14 is further connected to an economy mode selector switch 20 which is manually operable for selecting transmission shifting pattern set for better fuel economy. Though there has not been illustrated, it may also possible to connect another manually operable mode selector switch for selecting a power mode for selecting powerful shift pattern for better vehicular acceleration characteristics.

Figure 2:
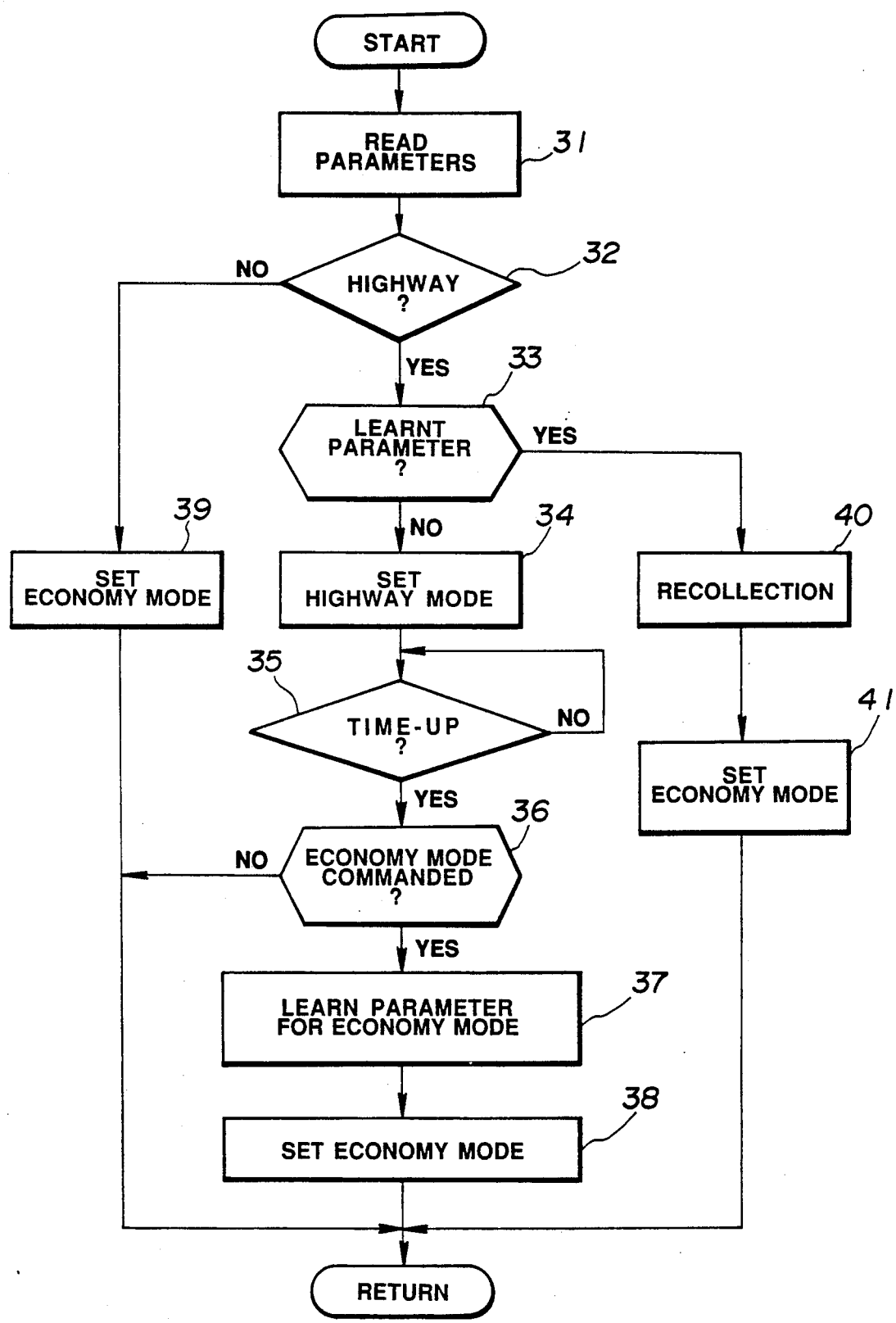
FIG. 2 is a flowchart showing a routine for selecting shifting pattern to be used in shift control to be implemented by the shift control system of FIG. 1.
Figure 3:
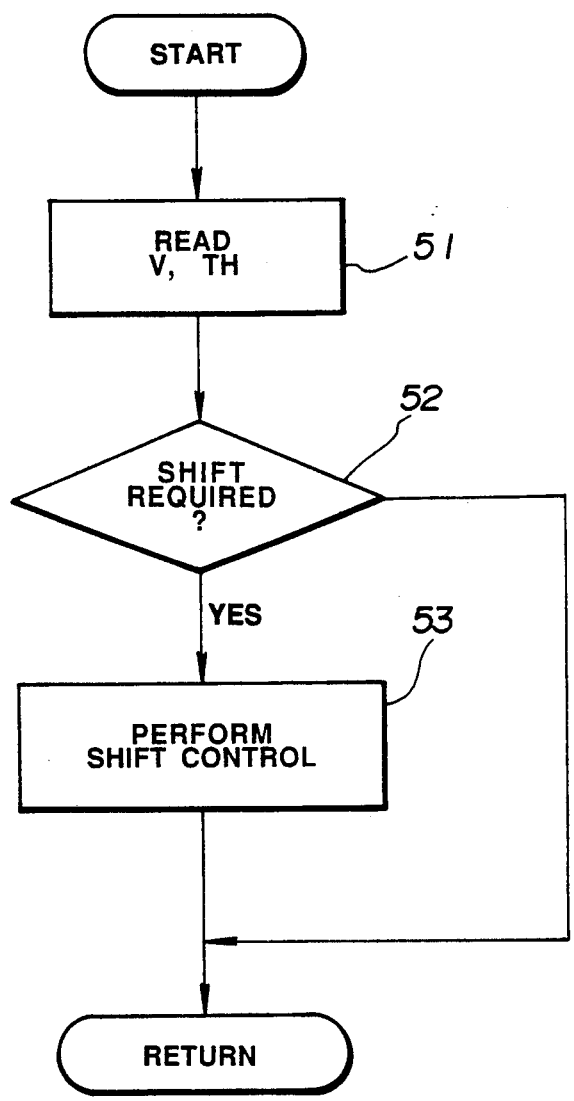
FIG. 3 is a flowchart showing a routine for performing shift control based on the selected shift pattern.

Based on the foregoing input parameters, the transmission control unit 14 performs transmission shift control operation. The operation to be performed by the transmission control unit 14 will be discussed herebelow with reference to FIGS. 2 and 3. The flowcharts of FIGS. 2 and 3 show respective routines for selecting transmission shift pattern and performing shift control. These routine are executed as time-triggered interrupt routines to be triggered every predetermined intervals.

Figure 4:
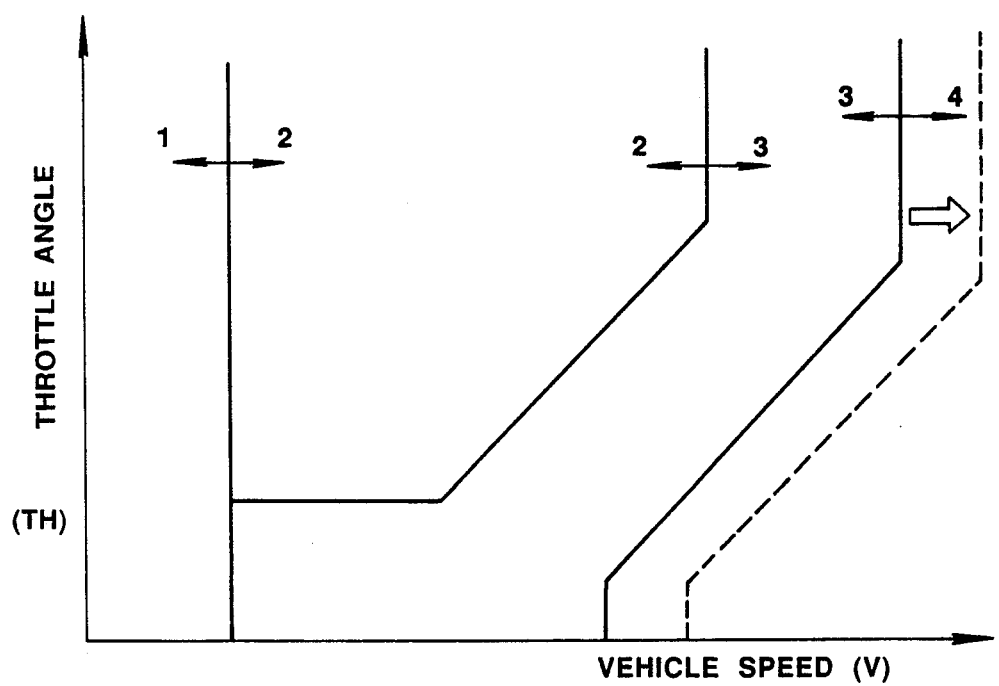
FIG. 4 is a chart showing example of shifting pattern to be selected in execution of the routine of FIG. 3.

In the process of FIG. 3, the input parameters, i.e. the throttle angle signal TH from the throttle angle sensor 8, the vehicle speed indicative signal V from the vehicle speed sensor 7, the engine speed indicative signal $N_E$ from the engine speed sensor 6, the input speed indicative signal $N_T$ from the input speed sensor 17, the output speed indicative signal $N_O$ from the output speed sensor 18, the braking condition indicative signal from the brake switch 19 and the economy mode selection signal from the economy mode switch 20 are read out, at a step 31. Then, at a step 32, a vehicle driving condition is discriminated whether the vehicle is traveling on a highway or not. As can be appreciated, at the highway, the vehicular traveling speed can be relatively high and maintained relatively constant and occurrence of application of brake is less frequent than that in the town road. Therefore, discrimination of highway can be made by checking the vehicle speed and frequency of application of brake. At the step 32, an average vehicle speed is derived and checked whether the average is speed is high or low. Also, distribution of instantaneous vehicle speed is also checked whether the vehicle speed fluctuation is relatively large or small. In addition, application frequency of the brake is checked. When the average speed is relatively high, the vehicle speed fluctuation is relatively in narrow range and frequency of application of brake is small, judgement can be made that the vehicle is traveling on the highway. If judgement can be made that the vehicle is traveling through the highway at the step 32, learnt data stored in terms of the same or similar combination of parameters at a step 33. In the shown embodiment, check is performed whether the manual input through the economy mode switch 20 is entered at the same or similar vehicle driving condition represented by the combination of the vehicle driving parameters. If the learnt date as checked cannot be found, process goes to the step 34 in which a 3-4shift line for highway mode as illustrated by broken line in FIG. 4 is selected at a step 34. Then, check is performed whether a predetermined period is expired after performing 4-3 down-shifting, at a step 35. The predetermined period is set at several seconds. Checking of elapsed time after 4-3 down-shifting is maintained over the predetermined period, e.g. several seconds. After expiration of the predetermined period as checked at the step 35, check is performed whether input for economy mode shift pattern is entered through the economy mode switch 20 at a step 36. In economy mode ordering input is not entered as checked at the step 36, process goes END and returned to a background job which governs a pluarlity of control routines. Therefore, when the answer is maintained at that adapted for highway as set at the step 34.

On the other hand, if order for economy mode is detected as checked at the step 36, learnt data for not to shift the 3-4 shifting pattern to the highway mode pattern is written in in a neural network so as to prevent the shift pattern from being shifted to the highway mode shift pattern. Updation of the learnt data is performed by way of back propagation and so forth. Thereafter, 3-4 shift pattern is returned to a predetermined low vehicle speed shift pattern as shown by solid line in FIG. 4, at a step 38.

On the other hand, of judgement at the step 32 is that the vehicle traveling not in the highway, 3-4 shift pattern is returned to an economy mode shift pattern as shown by solid line in FIG. 4, at a step 39. On the other hand, when the previously stored combination of the parameters for ordering economy mode shift pattern is detected as checked at a step 33, then recollection of the 3-4 shift pattern is performed at a step 40. The based on the recollected 3-4 shift pattern at the step 40, the 3-4shift line is shifted toward the lower speed mode.

It should be appreciated that though the shown routine in FIG. 2 switches the shifting pattern between the highway mode pattern and economy mode shift pattern, it may be possible to vary the shifting pattern continuously between the highway mode pattern and economy mode shift pattern.

FIG. 3 shows shift control routine for controlling the transmission speed ratio according to the shift pattern selected through the routine of FIG. 2. At the initial stage of execution of the shown routine, the transmission speed ratio adapted to the instantaneous vehicle driving condition is derived at a step 51. In practice, derivation of the adapted transmission speed ratio is determined in terms of the vehicle speed V and the throttle valve angular position TH. Then, the transmission speed ratio derived at the step 51 is compared with the instantaneous transmission speed ratio at a step 52 in the order to make judgement whether shifting operation is required or not. In the derived transmission speed ratio coincident with the instantaneous transmission speed ratio, process directly goes END and return to the main routine. Therefore, the instantaneous transmission speed ratio is maintained. On the other than, when derived transmission speed ratio is different from that of the instantaneous transmission speed ratio, judgement can be made that shifting operation is required. When judgement that shifting operation is required is made at a step 52, control signals are supplied to the shift solenoids 15a and 15b to establish combination of the energized solenoid and deenergized solenoid corresponding the derived transmission speed ratio.

As can be seen herefrom, according to the shown embodiment, once the driver's preference of economy mode shift pattern even at the highway, switching of transmission shift pattern to the highway mode is prevented. On the other hand, when the driver commands the economy mode shift pattern, the driver's preference at the specific condition is learnt and stored in the neural network. Therefore, during normal driving operation, neural network can be updated. With such design of control routines, it is initially required to set a plurality of shift patterns to be selected according to the vehicle driving condition as well as the examiner's preference. This can substantially reduces work load for designing the control system.

While the present invention has been discussed in terms of the preferred embodiment of the invention, the invention should be appreciated that the shown control system is applicable not only for transmission shift control, power steering control, suspension control, engine control and so forth. Therefore, the invention should be appreciated to include all application and all process which can be implemented without departing from the principle of the invention which is set out in the appended claims.

For example, in case of the suspension control, suspension characteristics may be controlled both in human and non-human controls. For example, in order to perform suspension control, traveling resistance, steering pattern and so forth are analyzed for adapting the suspension characteristics for the vehicle driving condition. In case of the mountainous road, it is generally required harder suspension characteristics for vehicular driving stability. However, some of the drivers may prefer maintenance of softer suspension characteristics. In such case, the driver may manually selects the softer suspension mode. The shown system may then learn the driver's preference and prevent the suspension characteristics from being switching into harder suspension mode when similar driving condition is detected.

What is claimed is:

1. A control system for an automotive vehicle for controlling vehicular component, comprising:
    first means for monitoring preselected control parameters for producing a control parameter indicative signals;
    second means for deriving a first control signal on the basis of said parameter indicative signals according to a preset common control schedule which defines operating modes of said vehicular component in relation to operating condition represented by said control parameter;
    third means for accepting manual entry of command for selecting operational mode of said vehicular component and learning operating conditions at entry of said manually entered command as a personal unique date reflecting driver's preference;
    fourth means for detecting said control parameter indicative signals representing operational condition coincidence with learnt condition for recollecting manually commanded operational mode and for producing a second control signal; and
    fifth means for selectively supplying one of said first and second control signals to said vehicular component for controlling operation thereof, said control signal supplying means outputting said first control signal while absence of said second control signal and outputs said second control signal while said second control signal present.

2. A control system for an automotive vehicle as set forth in claim 1, wherein said third means includes neural network for learning operational condition of said vehicular component at the occurrence of manually entered command for updating neural network storage.

3. A control system for an automotive vehicle for controlling vehicular component, comprising:
    first means for monitoring preselected vehicle driving parameters for producing a vehicle driving parameter indicative signals;
    second means for deriving a first control signal on the basis of said parameter indicative signals according to a preset common control schedule which defines operating modes of said vehicular component in relation to vehicular driving condition represented by said control parameter;
    third means for accepting manual entry of command for selecting operational mode of said vehicular component and learning vehicular driving conditions at entry of said manually entered command as a personal unique data reflecting driver's preference;
    fourth means for detecting said control parameter indicative signals representing vehicular driving condition coincidence with learnt condition for recollecting manually commanded operational mode and for producing a second control signal; and
    fifth means for selectively supplying one of said first and second control signals to said vehicular component for controlling operation thereof, said control signal supplying means outputting said first control signal while absence of said second control signal and outputs said second control signal while said second control signal present.

4. A control system for an automotive vehicle as set forth in claim 3, wherein said third means includes neural network for learning vehicular driving condition at the occurrence of manually entered command for updating neural network storage.

5. A control system for an automotive vehicle as set forth in claim 4, wherein said fourth means is responsive to said vehicle driving parameter indicative signal for predicting a vehicle driving condition and recollects one of manually entered command when the predicted vehicle driving condition coincidence with the corresponding learnt driving condition for deriving said second control signal based on the recollected command.

6. A shift control system for an automotive automatic power transmission comprising:
    an automatic power transmission unit having electrically operably shift control means for selectingly establishing one of a plurality of transmission speed ratio;
    a sensor means for monitoring vehicle driving parameter associated with transmission speed ratio selection for producing a vehicle driving condition indicatvie parameter signal;
    a shift pattern storage means storing a plurality of preset shift patterns which are set in terms of the vehicle driving parameter;
    a manual selector means for manual entry of a pattern selector command for manually selecting one of a plurality of shift patterns in said shift pattern storage means;
    a neural network responsive to said manually entered pattern selector command for learning condition of said vehicle driving conditions based on said vehicle driving condition indicative parameter signal and updating storage therein;
    a controller means for detecting vehicle driving condition based on the vehicle driving condition indicative parameter signal, comparing the detected vehicle driving condition with learnt vehicle driving conditions, recollecting one of commands stored in said neural network when the detected vehicle driving condition coincidence with the learnt vehicle driving condition, and otherwise selecting one of a plurality of shift pattern according to a predetermined shift pattern selecting schedule, and performing shift control by controlling operation of said shift control means according to the selected shift pattern.

7. A shift control system as set forth in claim 6, wherein said controller means predicts vehicle driving condition including vehicle driving environmental condition based on said vehicle driving condition indicative parameter signal and perfoms recollection of one of the stored commands and selection of shift pattern based on the predicted vehicle driving condition.

8. A control system for an automotive vehicle as set forth in claim 7, wherein said controller means generates a first control signal based on the shift pattern selected according to the predetermined shift pattern selecting schedule and a second control signal based on the shift pattern corresponding to the recollected command, and selects said second control signal whenever the recollected command is present and otherwise selects said first control signal.

* * * * *